April 21, 1953 R. W. MacDONALD 2,635,435
MOTOR VEHICLE COOLING SYSTEM
Filed Nov. 21, 1951 2 SHEETS—SHEET 1

INVENTOR.
Robert W. MacDonald,
BY Victor J. Evans & Co.
ATTORNEYS

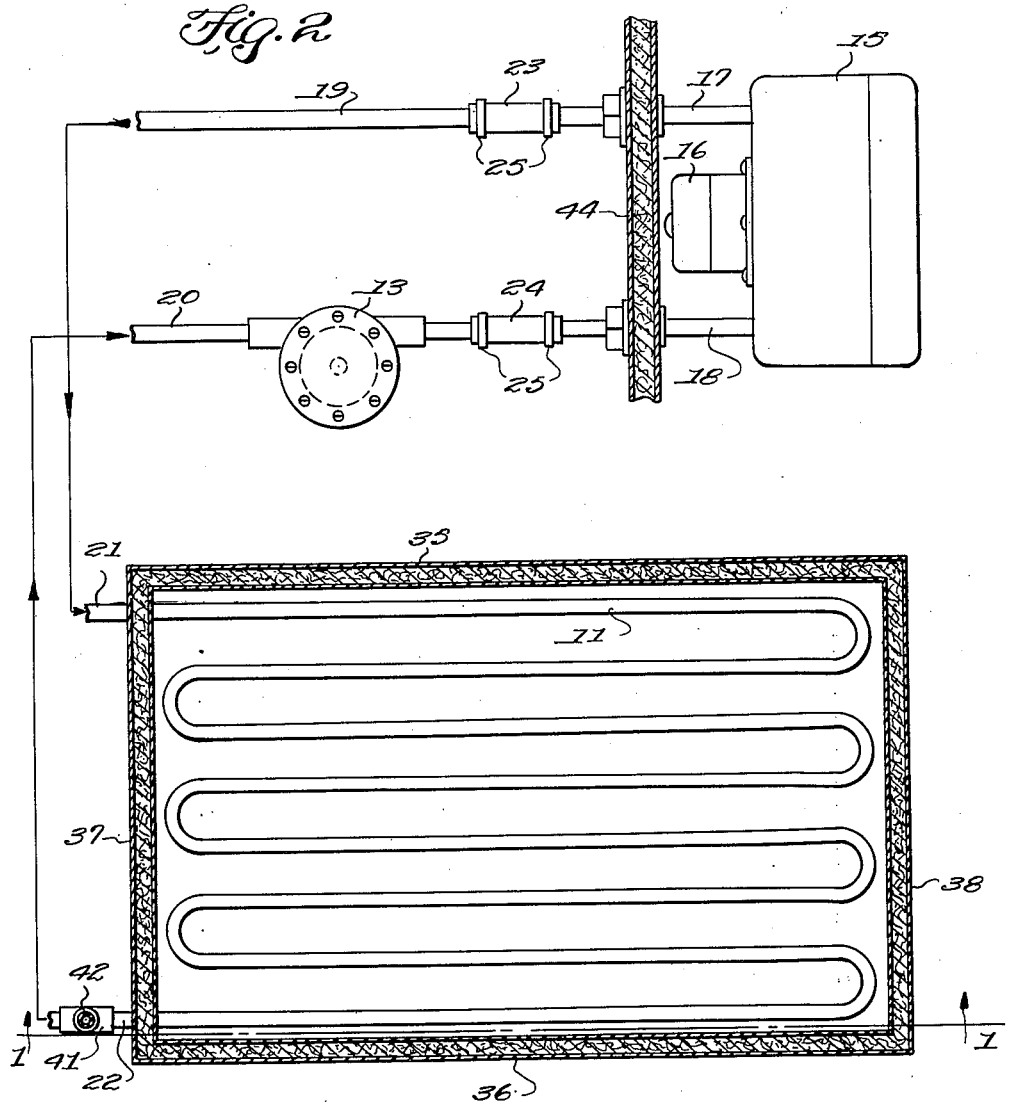

Patented Apr. 21, 1953

2,635,435

UNITED STATES PATENT OFFICE 2,635,435

MOTOR VEHICLE COOLING SYSTEM

Robert W. MacDonald, Riverside, Calif.

Application November 21, 1951, Serial No. 257,518

1 Claim. (Cl. 62—91.5)

This invention relates to air-conditioning and particularly cooling devices of the interior of motor vehicle bodies, and in particular a radiator supplied with refrigerant from a coil in a $CO_2$ or Dry Ice container with means for circulating the refrigerant and means for blowing air over the radiator and into the body of the vehicle.

The purpose of this invention is to provide an improved cooling system for motor vehicles whereby the heating radiator of the vehicle may be supplied with a refrigerant when it is desired to use the device for cooling.

Substantially all motor vehicles are provided with heaters and the heaters are formed with air circulating fans which blow air over a coil or radiator so that with hot water circulated through the radiator the interior of the vehicle is heated. With this thought in mind this invention contemplates disconnecting the radiator of the heater and connecting the radiator to means for supplying a refrigerant thereto so that with the refrigerant circulated through the radiator of the heater and cooled by Dry Ice a device may be provided for continuously cooling the interior of a vehicle in which the heater is mounted.

The object of this invention is, therefore, to provide means for circulating a refrigerant through the radiator of a motor vehicle heater when it is desired to reduce the temperature in the vehicle.

Another object of the invention is to provide means for cooling the interior of a motor vehicle by utilizing equipment commonly used in the vehicle.

A further object of the invention is to provide a motor vehicle cooling system which is of a simple and economical construction.

With these and other objects and advantages in view the invention embodies a Dry Ice cooler having a refrigerant coil therein with means for connecting the coil through a radiator of a motor vehicle heater and with means for circulating the refrigerant from the coil in the Dry Ice compartment through the radiator.

Other features and advantages of the invention will appear from the following description taken in connection with the drawing, wherein:

Figure 2 is a detail showing a plan view taken on line 2—2 of Figure 1 illustrating the tubular connections extended from the heater of a vehicle and showing a circulating pump in one of said connections.

Figure 3 is a sectional plan taken on line 3—3 of Figure 1 showing the refrigerant coil in the lower part of the Dry Ice compartment.

Figure 1:
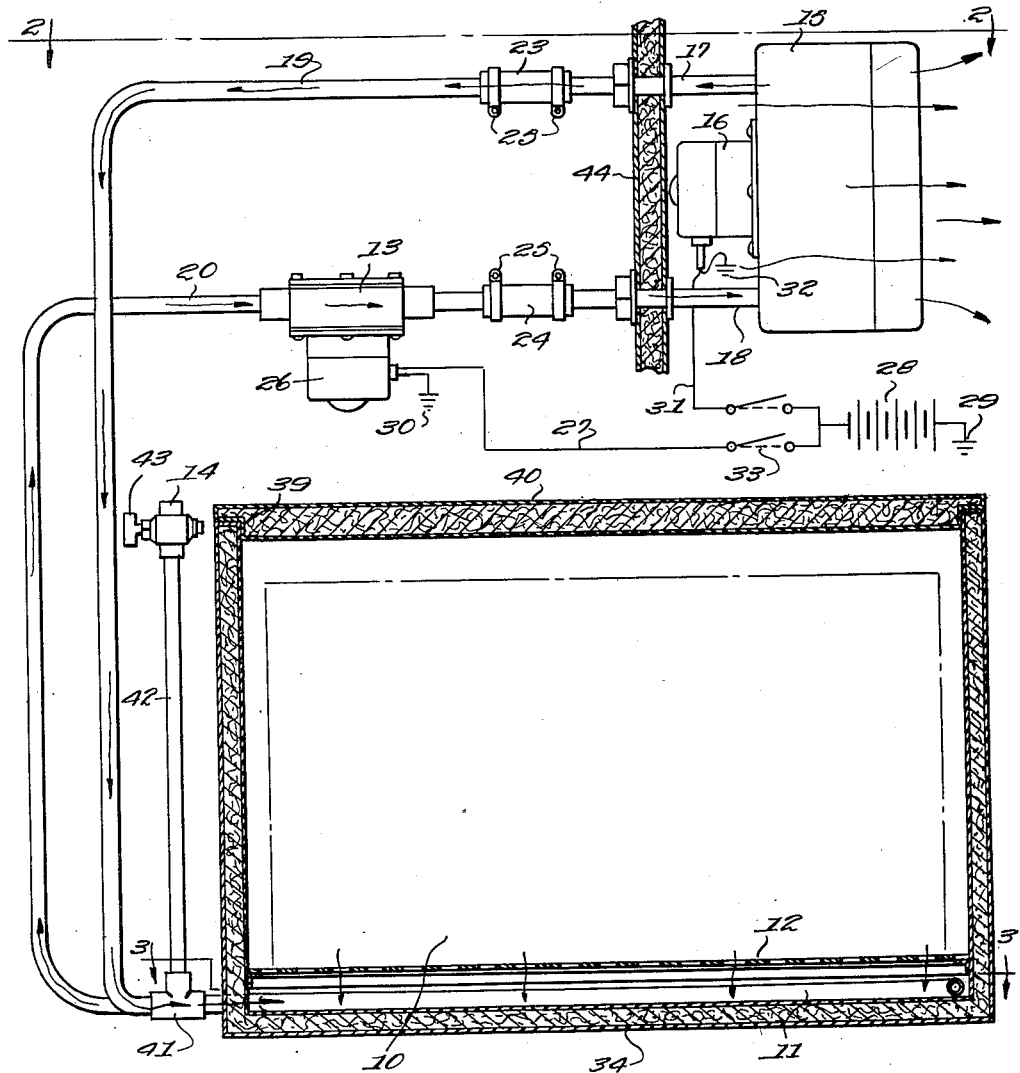
Figure 1 is a diagrammatic view showing a section through a cooler taken on line 1—1 of Figure 2 and illustrating connections from the cooler to a motor vehicle heater.

Referring now to the drawings wherein like reference characters denote corresponding parts the motor vehicle cooling system of this invention includes a Dry Ice or $CO_2$ compartment 10 having a refrigerant coil 11 in the lower end with a grid 12 separating the Dry Ice compartment from the coil, a circulating pump 13, an air vent 14 for releasing air in the system and a motor vehicle heater 15.

The heater 15 is of the conventional type having a radiator and fan therein with the fan actuated by a motor 16 and with the radiator provided with connections 17 and 18.

For use as a cooler the connections 17 and 18 are disconnected from the conventional connections to the motor vehicle radiator and connected by tubes 19 and 20, respectively to connections 21 and 22 of the refrigerant coil 11 in the lower part of the Dry Ice compartment 10.

The tubes 19 and 20 are connected to the radiator connections 17 and 18, respectively with flexible tubes 23 and 24 and the ends of the tubes are connected to the pipes with clamps 25.

The circulating pump 13 is connected in the tube 20, as shown in Figure 1 and this pump may be actuated with a motor 26, one terminal of which is connected by a wire 27 to a battery 28, the opposite terminal of which is connected to a ground 29 and the opposite terminal of the motor being connected to a ground 30.

One terminal of the motor 16 is also connected by a wire 31 to the battery 28 and the opposite terminal of the motor is connected to a ground 32.

Ignition switch 33 is provided in the wires 27 and 31 connecting the motor to the battery.

The Dry Ice compartment 10 is provided with a base 34 with side walls 35 and 36 and end walls 37 and 38 extending upwardly from the base. The upper edges of the walls extend into a continuous recess 39 of a cover 40 which provides a closure substantially sealing the Dry Ice compartment.

The grid 12 is secured to the inner surfaces of the side and end walls and retains the Dry Ice in spaced relation to the coil 11.

The connection 22 at one end of the coil 11 is provided with a fitting 41 and a tube 42 extended upwardly from the fitting 41 provides means for mounting the air vent 14 by which air may be bled from the system by operating the valve 43 therein.

The Dry Ice compartment 10 may be installed in any suitable position in the vehicle and, as illustrated in Figures 1 and 2 tubes connecting the compartment to the heater extend through a wall 44, behind a cowl or other part of the vehicle body.

As illustrated in the drawings the Dry Ice compartment 10 is provided with insulated walls and the base and cover are also of double wall construction with insulating material between the walls.

In this system a switch 33 is closed to complete circuits to the motors 16 and 26 and as the refrigerant is circulated from the coil 11 to the radiator of the heater 15 the motor 16 actuates the fan of the heater whereby air is blown through the radiator or cooling coil and into the body of the vehicle.

It will be understood that any suitable refrigerant may be used and it will also be understood that modifications may be made in the design and arrangement of the parts without departing from the spirit of the invention.

What is claimed is:

A motor vehicle cooler for use in combination with the radiator of the heating housing of the vehicle comprising an insulated box-like housing having a chamber for a refrigerant therein, a pipe coil in said housing and positioned below said chamber, tubular connections from opposite ends of said coil connecting the coil to inlet and outlet connections of said radiator, circulating means in one of said tubular connections, a vertically disposed tube having a valve in the upper end and extended upwardly from one of said tubular connections providing a vent whereby gas accumulating in said vertically disposed tube may be released to the atmosphere, and hose connections in said tubular connections whereby the inlet and outlet connections of the radiator may, selectively, be connected to said pipe coil of the refrigerant housing or to the radiator of the vehicle.

ROBERT W. MacDONALD.

References Cited in the file of this patent

UNITED STATES PATENTS

| Number | Name | Date |
|---|---|---|
| 1,946,994 | Waderlow | Feb. 13, 1934 |
| 2,075,389 | Eubank | Mar. 30, 1937 |
| 2,107,199 | Gaugler | Feb. 1, 1938 |
| 2,186,562 | Sperry | Jan. 9, 1940 |